US008330643B2

(12) United States Patent
Erkocevic-Pribic et al.

(10) Patent No.: US 8,330,643 B2
(45) Date of Patent: Dec. 11, 2012

(54) SURVEILLANCE SYSTEM FOR DETECTING TARGETS WITH HIGH CROSS-RANGE RESOLUTION BETWEEN TARGETS

(75) Inventors: Radmila Erkocevic-Pribic, Delfgauw (NL); Willem Andries Hol, Hengelo (NL); Ton Peerdeman, Apeldoorn (NL)

(73) Assignee: Thales Nederlands B.V., GD Hengelo (NL)

( * ) Notice: Subject to any disclaimer, the term of this patent is extended or adjusted under 35 U.S.C. 154(b) by 332 days.

(21) Appl. No.: 12/872,971

(22) Filed: Aug. 31, 2010

(65) Prior Publication Data

US 2011/0080316 A1   Apr. 7, 2011

(30) Foreign Application Priority Data

Aug. 31, 2009   (EP) ..................................... 09169085

(51) Int. Cl.
*G01S 13/90* (2006.01)

(52) U.S. Cl. .......................... 342/25 A; 342/90; 342/179
(58) Field of Classification Search ................ 342/25 R, 342/25 A–25 F, 90, 179, 192, 196
See application file for complete search history.

(56) References Cited

U.S. PATENT DOCUMENTS

| 4,667,200 A * | 5/1987 | Gellekink et al. ............. 342/202 |
| 5,281,972 A * | 1/1994 | Jain ............................... 342/25 F |
| 5,442,362 A * | 8/1995 | Zwarts ........................... 342/176 |
| 6,781,540 B1 * | 8/2004 | MacKey et al. ............... 342/25 F |
| 2004/0085238 A1 * | 5/2004 | Erkocevic-Pribic ............ 342/17 |
| 2008/0260531 A1 | 10/2008 | Stommel |
| 2011/0080316 A1 * | 4/2011 | Erkocevic-Pribic et al. .. 342/179 |
| 2011/0279305 A1 * | 11/2011 | Lellouch et al. ............... 342/107 |
| 2011/0285581 A1 * | 11/2011 | Hol et al. ....................... 342/25 F |

FOREIGN PATENT DOCUMENTS

| EP | 2293100 A1 * | 3/2011 |
| JP | 05215843 A * | 8/1993 |
| WO | 2008/063691 | 5/2008 |

OTHER PUBLICATIONS

Emmanuel J. Candés et al. "Robust Uncertainty Principles: Exact Signal Reconstruction From Highly Incomplete Frequency Information" IEEE Transactions on Information Theory, IEEE, US, vol. 52, No. 2, Feb. 1, 2006, pp. 489-509, XP002491493.
Emmanuel J. Candés et al. "An Introduction to Compressive Sampling" IEEE Signal Processing Magazine, IEEE Service Center, Piscataway, NJ, US, vol. 25, No. 2, Mar. 1, 2008, pp. 21-30, XP011225660.
Marivi Tello et al. "A Novel Strategy for Radar Imaging Based on Compressive Sensing" GeoScience and Remote Sensing Symposium, 2008. IGARSS 2008. IEEE International, IEEE, Piscataway, NJ, USA, Jul. 7, 2008, pp. II-213, XP031422125.
Search Report, mailed on Feb. 8, 2010, for EP 09169085.9, filed on Aug. 31, 2009.

* cited by examiner

*Primary Examiner* — John B Sotomayor
(74) *Attorney, Agent, or Firm* — Stroock & Stroock & Lavan LLP

(57) ABSTRACT

A surveillance system for detecting targets with high cross-range resolution between targets. The system includes at least two radar antennae mounted on blades of a windmill and is configured to apply a compressive sensing technique when the blades do not rotate.

7 Claims, 2 Drawing Sheets

SURVEILLANCE SYSTEM FOR DETECTING TARGETS WITH HIGH CROSS-RANGE RESOLUTION BETWEEN TARGETS

CROSS-REFERENCE TO PRIOR APPLICATIONS

The application claims priority to French Patent Application No. 09169085.9, filed on Aug. 31, 2009, which is incorporated by reference herein in its entirety.

FIELD

The present invention relates to a surveillance system for detecting targets with high cross-range resolution between targets. For example, the invention is particularly applicable to air, ground and sea surveillance systems.

BACKGROUND

The present application is a follow-up of a European Patent Application filed by the same applicant on Dec. 2, 2008, of which number is EP08170468.6 and of which title is "A surveillance system comprising a radar antenna mounted on a blade of a windmill," which is incorporated by reference herein. It is hereunder referenced to as "the previous application". Basically, the previous application describes a surveillance system for detecting targets, the system including a Synthetic Aperture Radar (SAR) antenna mounted on a blade of a windmill. In particular, such an arrangement allows for estimation of cross-range between targets with high resolution when the blade rotates. However, a drawback of such an arrangement is that the SAR capability is not operational in the absence of wind or when the wind is not strong enough to drive the blade in rotation, hereby preventing high cross-range resolution.

Existing solutions based on stationary radar antennas suggest enhancing the cross-range resolution between targets by means of a data fusion technique. For example, interferometry may achieve satisfactory results from several measurements varying in size.

SUMMARY

An aspect of the present invention provides a system which may be used to provide enhanced cross-range resolution between targets, using radar antennas mounted on the blades of a windmill in the absence of wind. An aspect of the invention proposes a surveillance system for detecting targets. The system includes at least one radar antenna mounted on a blade of a windmill and means to apply a compressive sensing technique when the blade does not rotate.

The article "An introduction to compressive sampling" (E. J Candès and M. B Wakin in IEEE Signal Processing magazine, March 2008) provides a good presentation of the compressive techniques, and is incorporated by reference herein.

The applied compressive sensing technique may include a step of reconstructing a cross-range image ρ at a certain distance to the rotation axis of the windmill blades. A measurement vector s may contain measurements performed by the radar antennas at slant ranges corresponding to their respective distances to the cross-range image ρ. The cross-range image ρ may be given by $s = E\rho + z$, where E may be a measurement matrix and z may correspond to random disturbances. For example, the cross-range image ρ may then be estimated by optimization of its amplitude.

Preferably, the measurement matrix E may contain a model of a radar echo s together with a geometry that may determine the distances from the radar antennas to the cross-range image ρ.

Preferably, the radar echo model may describe the radar echo s in the spectral domain as a transmitted signal whose amplitude and phase may be modulated.

For example, the radar echo model may be a narrowband model, which may describe the radar echo s as a time-delayed and doppler-shifted replica of the transmitted signal.

For example, the radar echo model may be a wideband model, which may describe the radar echo s by the true Doppler effect. For example, the true Doppler effect may be described by scaling of a time-delayed replica of the transmitted signal.

Optionally, the radar echo model may include an amplitude modulation of the measurements performed by the radar antennas.

Thus, embodiments of the present invention in any of its aspects is that it provides the same or better results from less data than any traditional Nyquist-based sampling methods. Thus, embodiments of the invention provide a compact solution, which is applicable both with a few antennas on several stationary blades and with a single antenna on a single rotating blade.

Embodiments of the present invention in any of its aspects also provides a model-based solution. It can therefore naturally accommodate any scenario, by including the scenario peculiarities into the model.

BRIEF DESCRIPTION OF THE DRAWINGS

Non-limiting examples of the invention are described below with reference to the accompanying drawings in which:

the FIG. 1 schematically illustrates, in the presence of wind, the geometry of an exemplary basic configuration, in which a single radar antenna is mounted on a blade of a windmill, so as to apply a SAR technique according to the prior art;

Figure 2:
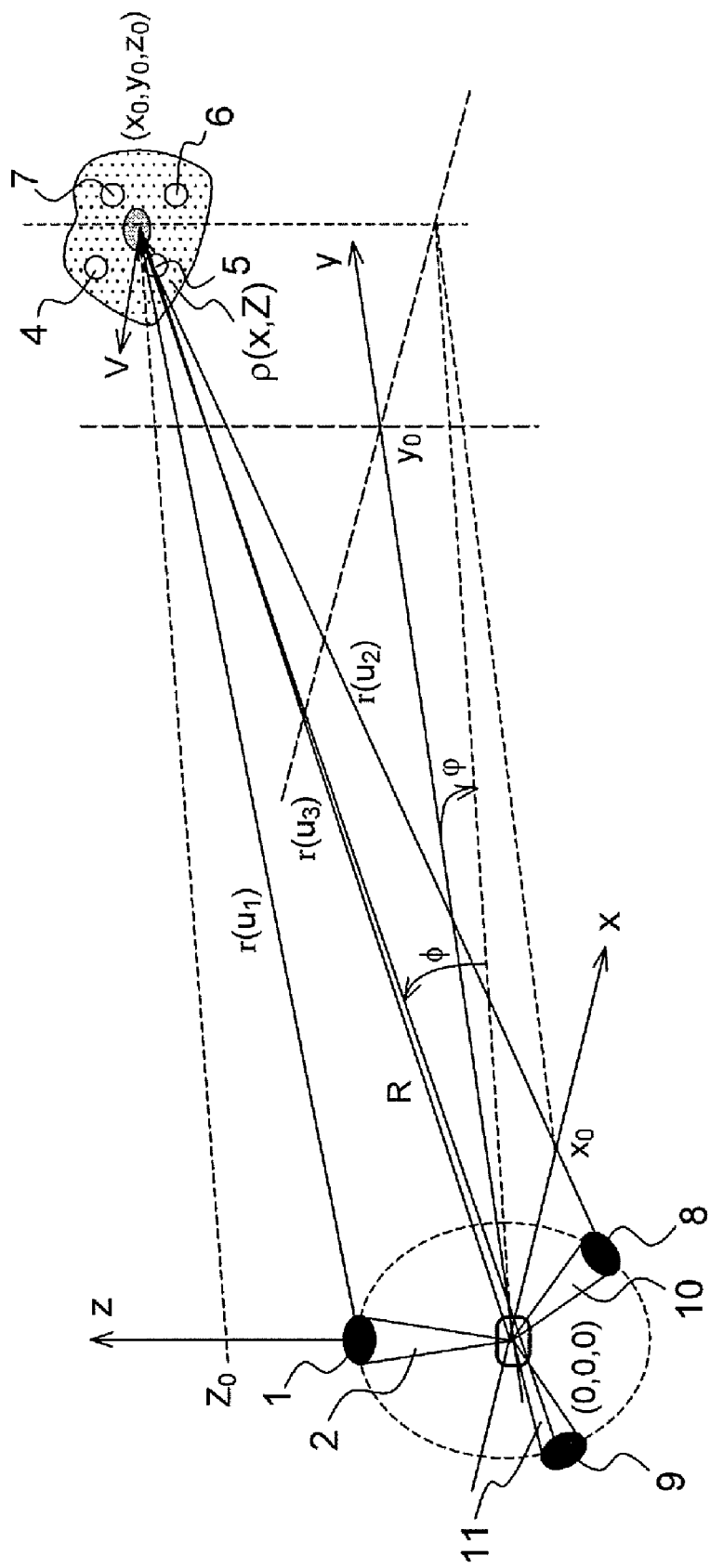

the FIG. 2 schematically illustrates, in the absence of wind, the geometry of another configuration, in which three exemplary radar antennas are mounted on the blades of a windmill, so as to apply a compressive sensing technique according to an embodiment of the invention.

In the figures, like reference signs are assigned to like items.

DETAILED DESCRIPTION

Figure 1:
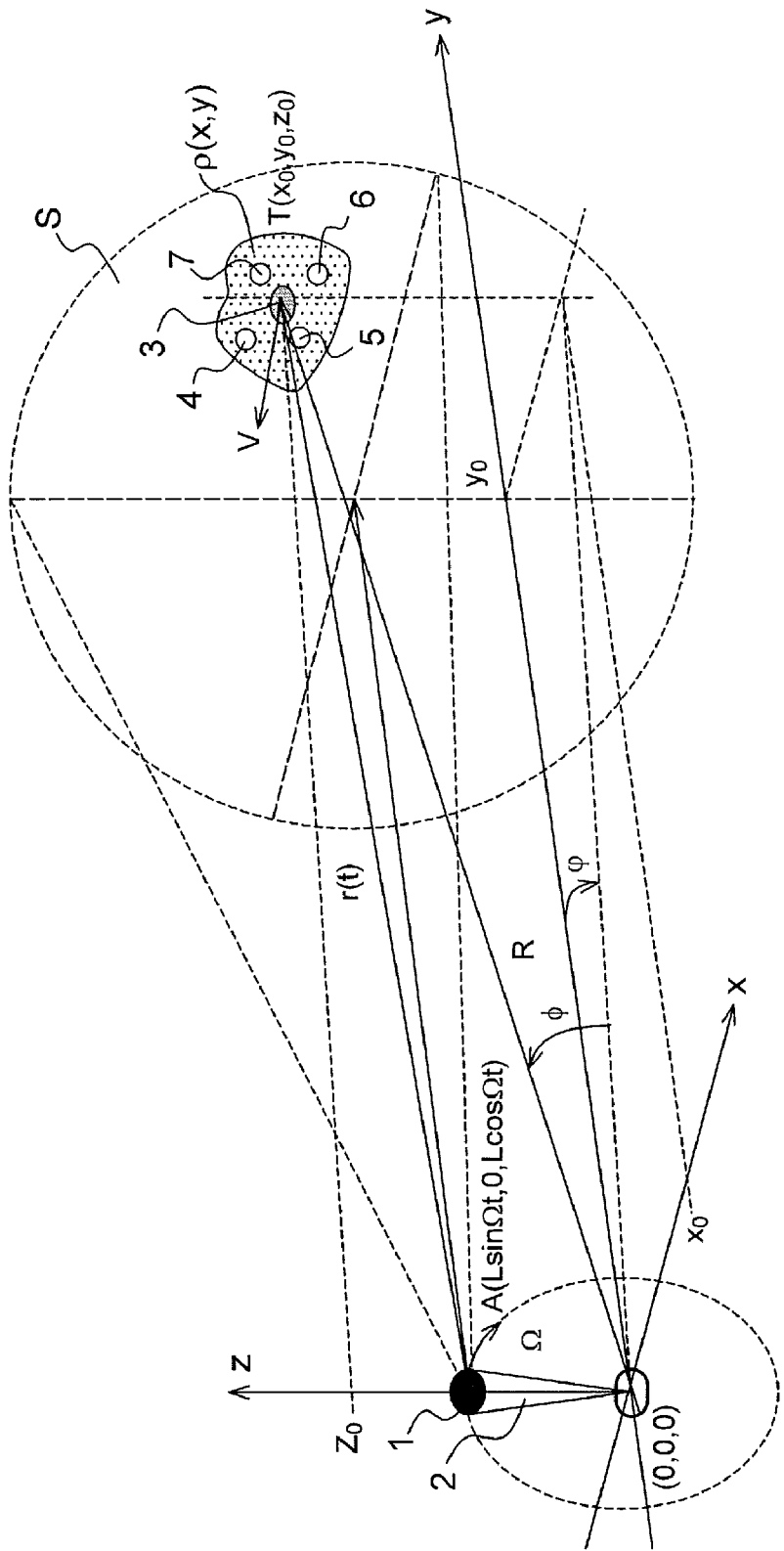

FIG. 1 schematically illustrates the geometry of an exemplary basic configuration, in which a single SAR antenna 1 is mounted on a single blade 2 of a windmill. In the presence of wind, the antenna 1 is driven in rotation with a radial speed Ω in a vertical x-z plane from a point (0,0,L) to a point (L sin Ωt,0,L cos Ωt) at time t, L being the length of the blade 2 and the rotation axis of the windmill blades being at (0,0,0). In a cross-range image ρ(x,z), a target containing individual scatterers 3 to 7 may translate with a constant speed v in any direction from an initial position (e.g. a scatterer 3 from $T(x_0, y_0, z_0)$ located at azimuth φ, elevation Φ and range R from (0,0,0)). It is located at slant range r(t) from the antenna 1 at time t. At the ground range $y_0$ of the target, a disc-shaped swath S may be illuminated when the blade 2 rotates. The swath S is the area in which coherent data are measured. Thus, when the blade 2 rotates, the geometry of this exemplary SAR system enables establishing the cross-range image ρ(x,z) containing the target 3 as well as other targets 4, 5, 6 and 7 in the swath S, as detailed in the previous application. Unfortunately, in the absence of wind or when the wind is not strong enough to drive the blade in rotation, the SAR capability is not operational, hereby preventing accurate cross-range estimation.

FIG. 2 schematically illustrates the geometry of another exemplary configuration, in which three radar antennas 1, 8 and 9 may be mounted on three blades 2, 10 and 11 respectively. In the absence of wind, measurement may be performed at only three angles $u_1$, $u_2$ and $u_3$, corresponding to three slant ranges $r(u_1)$, $r(u_2)$ and $r(u_3)$ respectively. Only a few data being measured, then no swath area can be defined and no SAR processing could be performed. However, the geometry illustrated by FIG. 2 can be seen as equivalent to the geometry illustrated by FIG. 1, but with fewer angles of measurement.

The compressive sensing technique may be able to reconstruct an unknown signal ρ from as few as possible measurements s about the signal ρ, because this technique is based on sparsity of the signal ρ to be reconstructed, together with low coherence of the measurements to be acquired. Compressive sensing techniques are iterative methods, which may be implemented by virtue of software means. In the present embodiment of FIG. 2, the low mutual coherence of data measured at the angles $u_1$, $u_2$ and $u_3$ is in relation with the known configuration of the antennas 1, 8 and 9 mounted on the blades 2, 8 and 9 respectively. Thus, a cross-range image ρ(x,z) can be reconstructed from a measurement vector s containing measurements of the radar echo s at the three angles $u_1$, $u_2$ and $u_3$. The relation between ρ and s may be assumed to be a linear projection, as given by the following linear relation (1):

$$\underline{s} = E\rho + \underline{z} \quad (1)$$

where E may be a measurement matrix and z may correspond to random disturbances.

Basic compressive sensing may estimate ρ by optimization of its amplitude, subject to its linear relation with the measurements s. Advanced compressive sensing may also enable noisy signal s, as well as enhanced ρ-sparsity. Initially, the ρ-sparsity may be improved by weighted $l_1$-optimization. The norm-$l_1$ may also be replaced by a lower norm-$l_p$, where 0<p<1, because it may reduce s. Any weighted $l_p$-optimization may also be solved as weighted $l_2$-optimization by the particular choice of the weights. Finally, separating points from regions in the enhanced imaging, could further refine the weighted $l_p$-optimization. The coherence of the measurements may be defined as the maximum inner product between two different normalized columns of the linear projection matrix E. Extremely low coherence may be achieved by additional randomizing of E.

In the present embodiment of FIG. 2, a measurement matrix E may contain a model of the radar echo s, together with the geometry that may determine the distances from the radar. Preferably, the radar echo model may describe the received signal s in the spectral domain, as a transmitted signal whose amplitude and phase are modulated. The phase modulation origins from the time-delays caused by the ranges. Furthermore, the radar echo s may be narrowband or wideband. For example, a narrowband model may describe the radar echo s as a time-delayed and doppler-shifted replica of the transmitted signal. As another example, a wideband model may describe the radar echo s by the true Doppler effect, for example by scaling of a time-delayed replica of the transmitted signal. Optionally, the radar-echo model may also include the amplitude modulation of measurements, caused by antenna-beam steering needed for swath-adaptive imaging for example, and/or target-reflectivity depending on radar frequencies and/or look angles, antenna polarization, etc.

Thus, an embodiment of the present invention enables to observe air, ground and sea with enhanced cross-range resolution in both azimuth and elevation, from convenient heights and locations of a windmill. It is worth noting that new windmills, so-called "wind-turbines", are available in such areas that need reconnaissance and surveillance in security and military applications.

An embodiment of the present invention also works with less data than required by any traditional Nyquist-based sampling methods. Accordingly, it can help not only in the case of less measurement angles, but also in the case of less radar wavenumbers. Embodiments of the invention can be used with or without wind, because it can provide comparable results from less data, if not the same results.

An embodiment of the present invention in any of its aspects provides a compact model-based solution. It can therefore naturally accommodate any scenario, by including the scenario peculiarities into the model. Accordingly, it can easily be adapted not only to less look angles caused by the absence of wind or caused by the partial rotation of the blades, but also to narrower signal bandwidth, to radar type (e.g. pulse radar or FMCW radar), to amplitude modulation, to target type, to the radar configuration, etc.

In addition, an embodiment of the invention allows for improved target classification.

The present invention is not limited to the embodiments described herein, reference should be had to the appended claims.

The invention claimed is:

1. A surveillance system for detecting a plurality of targets, the system comprising at least two radar antennae each of which is mounted on one of a plurality of blades of a windmill, and being configured to apply a compressive sensing technique when the blades do not rotate, the applied compressive sensing technique including:
a step of reconstructing a cross-range image ρ at a certain distance (y0) from the windmill blades, a measurement vector s including measurements performed by the radar antennae at slant ranges (r(u1), r(u2), r(u3)) corresponding to their respective distances to the cross-range image ρ, the cross-range image ρ being given by s=Eρ+z, where E is a measurement matrix and z corresponds to random disturbances, the measurement matrix E including a model of a radar echo s together with a geometry that determines the distances from the radar antennae to the cross-range image ρ.

2. The surveillance system as claimed in claim 1, wherein the cross-range image ρ is estimated by optimization of its amplitude.

3. The surveillance system as claimed in claim 1, wherein the radar echo model describes the radar echo s in the spectral domain as a transmitted signal whose amplitude and phase are modulated.

4. The surveillance system as claimed in claim 3, wherein the radar echo model is a narrowband model, which describes the radar echo as a time-delayed and doppler-shifted replica of the transmitted signal.

5. The surveillance system as claimed in claim 3, wherein the radar echo model is a wideband model, which describes the radar echo s by a true Doppler effect.

6. The surveillance system as claimed in claim 5, wherein the true Doppler effect is described by scaling of a time-delayed replica of the transmitted signal.

7. The surveillance system as claimed in claim 3, wherein the radar echo model includes an amplitude modulation of the measurements performed by the radar antennas.

* * * * *